United States Patent
Cho

(10) Patent No.: US 8,510,519 B2
(45) Date of Patent: *Aug. 13, 2013

(54) HYBRID RAID CONTROLLER

(75) Inventor: Byungcheol Cho, Seochogu (KR)

(73) Assignee: Taejin Info Tech Co., Ltd., Seoul (KR)

( * ) Notice: Subject to any disclaimer, the term of this patent is extended or adjusted under 35 U.S.C. 154(b) by 174 days.

This patent is subject to a terminal disclaimer.

(21) Appl. No.: 12/848,281

(22) Filed: Aug. 2, 2010

(65) Prior Publication Data

US 2012/0030410 A1  Feb. 2, 2012

(51) Int. Cl.
*G06F 12/02* (2006.01)
(52) U.S. Cl.
USPC .... 711/154; 711/114; 711/162; 711/E12.001; 711/E12.103; 710/22; 710/313
(58) Field of Classification Search
USPC .......... 711/112, 114, 162, E12.001, E12.103, 711/154, 103; 710/22, 313
See application file for complete search history.

(56) References Cited

U.S. PATENT DOCUMENTS

| | | | | |
|---|---|---|---|---|
| 6,401,170 | B1* | 6/2002 | Griffith et al. | 711/114 |
| 7,315,911 | B2* | 1/2008 | Davies et al. | 710/260 |
| 7,805,564 | B2* | 9/2010 | Matsunami et al. | 711/114 |
| 2006/0148310 | A1* | 7/2006 | Funahashi | 439/502 |
| 2008/0244127 | A1* | 10/2008 | Huang | 710/105 |
| 2008/0282264 | A1* | 11/2008 | Chen et al. | 719/320 |
| 2009/0327211 | A1* | 12/2009 | McCune et al. | 707/1 |

FOREIGN PATENT DOCUMENTS

| | | |
|---|---|---|
| KR | 10-2007-0029358 A | 3/2007 |
| KR | 10-2010-0036528 A | 4/2010 |

OTHER PUBLICATIONS

Office Action dated Dec. 7, 2011 in Korean Application No. 10-2011-0075705, filed Jul. 29, 2011.

* cited by examiner

*Primary Examiner* — Pierre-Michel Bataille
(74) *Attorney, Agent, or Firm* — Saliwanchik, Lloyd & Eisenschenk

(57) ABSTRACT

Provided is a hybrid RAID controller for a storage device of a PCI-Express (PCI-e) type that supports a low-speed data processing speed for a host. Specifically, embodiments of this invention provide a hybrid RAID controller coupled to one or more (i.e., a set of) semiconductor storage device (SSD) memory disk units and one or more hard disk drive (HDD)/Flash memory units. Among other things, the SSD memory disk units and/or HDD/Flash memory units adjust a synchronization of a data signal transmitted/received between the host and a memory disk during data communications between the host and the memory disk through a PCI-Express interface and simultaneously support a high-speed data processing speed for the memory disk, thereby supporting the performance of the memory to enable high-speed processing in an existing interface environment at the maximum.

17 Claims, 5 Drawing Sheets

HYBRID RAID CONTROLLER

CROSS-REFERENCE TO RELATED APPLICATION

This application is related in some aspects to commonly-owned, co-pending application Ser. No. 12/758,937, entitled "SEMICONDUCTOR STORAGE DEVICE", filed on Apr. 13, 2010. This application is also related in some aspects to commonly-owned, co-pending application Ser. No. 12/763, 701, entitled "RAID CONTROLLED SEMICONDUCTOR STORAGE DEVICE", filed on Apr. 20, 2010. This application is also related in some aspects to commonly-owned, co-pending application Ser. No. 12/763,688 entitled "RAID CONTROLLER FOR A SEMICONDUCTOR STORAGE DEVICE", filed on Apr. 20, 2010. This application is also related in some aspects to commonly-owned, co-pending application Ser. No. 12/848,348 entitled "RAID CONTROLLER HAVING MULTI PCI BUS SWITCHING", filed on Aug. 2, 2010.

FIELD OF THE INVENTION

The present invention relates to a hybrid RAID controller for a semiconductor storage device of a PCI-Express (PCI-e) type. Specifically, the present invention relates to a storage device of a PCI-Express type for providing data storage/reading services through a PCI-Express interface.

BACKGROUND OF THE INVENTION

As the need for more computer storage grows, more efficient solutions are being sought. As is known, there are various hard disk solutions that store/read data in a mechanical manner as a data storage medium. Unfortunately, data processing speed associated with hard disks is often slow. Moreover, existing solutions still use interfaces that cannot catch up with the data processing speed of memory disks having high-speed data input/output performance as an interface between the data storage medium and the host. Therefore, there is a problem in the existing area in that the performance of the memory disk cannot be property utilized.

SUMMARY OF THE INVENTION

Embodiments of the present invention provide a hybrid RAID controller for a storage device of a PCI-Express (PCI-e) type that supports a low-speed data processing speed for a host. Specifically, embodiments of this invention provide a hybrid RAID controller coupled to one or more (i.e., a set of) semiconductor storage device (SSD) memory disk units and one or more hard disk drive (HDD)/Flash memory units. Among other things, the SSD memory disk units and/or HDD/Flash memory units adjust a synchronization of a data signal transmitted/received between the host and a memory disk during data communications between the host and the memory disk through a PCI-Express interface and simultaneously support a high-speed data processing speed for the memory disk, thereby supporting the performance of the memory to enable high-speed processing in an existing interface environment at the maximum.

A first aspect of the present invention provides a hybrid RAID controller, comprising: a first disk mount coupled to a set of SSD memory disk units, the set of SSD memory disk units comprising a set of volatile semiconductor memories; a first disk monitoring unit coupled to the first disk mount for monitoring the set of SSD memory disk units; a disk plug and play controller coupled to the first disk monitoring unit and the first disk mount for controlling the disk mount; a high speed host interface coupled to the first disk monitoring unit and the first disk mount for providing high-speed host interface capabilities; a second disk mount coupled to a set of HDD/Flash memory units; and a second disk monitoring unit coupled to the second disk mount for monitoring the set of HDD/Flash memory units.

A second aspect of the present invention provides a hybrid RAID controller, comprising: a first disk mount coupled to a set of PCI-Express SSD memory disk units, the set of PCI-Express SSD memory disk units comprising a set of volatile semiconductor memories; a first disk monitoring unit coupled to the first disk mount for monitoring the set of PCI-Express memory disk units; a disk plug and play controller coupled to the first disk monitoring unit and the disk mount for controlling the first disk mount; a high speed host interface coupled to the first disk monitoring unit and the first disk mount for providing high-speed host interface capabilities; a second disk mount coupled to a set of HDD/Flash memory units; a second disk monitoring unit coupled to the second disk mount for monitoring the set of HDD/Flash memory units; a disk controller coupled to the high speed host interface, the first disk monitoring unit and the second disk monitoring unit; and a host interface coupled to the disk controller.

A third aspect of the present invention provides a method for providing a hybrid RAID controller, comprising: providing a first disk mount coupled to a set of SSD memory disk units, the set of SSD memory disk units comprising a set of volatile semiconductor memories; providing a first disk monitoring unit coupled to the first disk mount for monitoring the set of SSD memory disk units; providing a disk plug and play controller coupled to the first disk monitoring unit and the first disk mount for controlling the disk mount; providing a high speed host interface coupled to the disk monitoring unit and the disk mount for providing high-speed host interface capabilities; providing a second disk mount coupled to a set of HDD/Flash memory units; and providing a second disk monitoring unit coupled to the second disk mount for monitoring the set of HDD/Flash memory units.

BRIEF DESCRIPTION OF THE DRAWINGS

These and other features of this invention will be more readily understood from the following detailed description of the various aspects of the invention taken in conjunction with the accompanying drawings in which.

Figure 1:
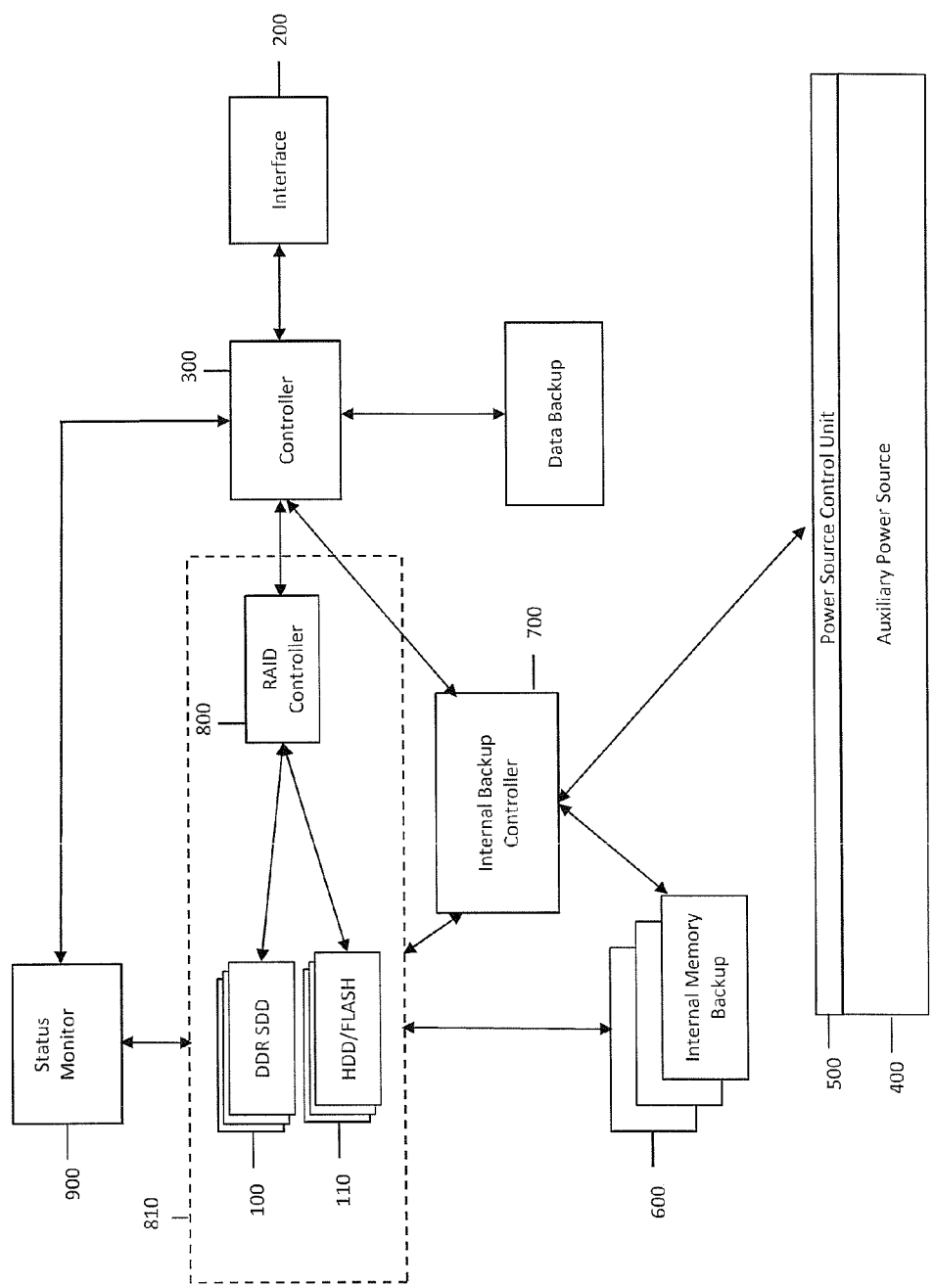
FIG. 1 is a diagram schematically illustrating a configuration of a hybrid RAID controlled storage device of a PCI-Express (PCI-e) type according to an embodiment.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Exemplary embodiments will be described more fully herein with reference to the accompanying drawings, in which exemplary embodiments are shown. This disclosure may, however, be embodied in many different forms and should not be construed as limited to the exemplary embodiments set forth therein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limited to this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof. Moreover, as used herein, the term RAID means redundant array of independent disks (originally redundant array of inexpensive disks). In general, RAID technology is a way of storing the same data in different places (thus, redundantly) on multiple hard disks. By placing data on multiple disks, I/O (input/output) operations can overlap in a balanced way, improving performance. Since multiple disks increase the mean time between failures (MTBF), storing data redundantly also increases fault tolerance.

Unless otherwise defined, all terms (including technical and scientific terms) used herein have the same meaning as commonly understood by one of ordinary skill in the art. It will be further understood that terms such as those defined in commonly used dictionaries should be interpreted as having a meaning that is consistent with their meaning in the context of the relevant art and the present disclosure, and will not be interpreted in an idealized or overly formal sense unless expressly so defined herein.

Hereinafter, a RAID storage device of a PCI-Express (PCI-e) type according to an embodiment will be described in detail with reference to the accompanying drawings.

As indicated above, embodiments of the present invention provide a hybrid RAID controller for a storage device of a PCI-Express (PCI-e) type that supports a low-speed data processing speed for a host. Specifically, embodiments of this invention provide a hybrid RAID controller coupled to one or more (i.e., a set of) semiconductor storage device (SSD) memory disk units and one or more hard disk drive (HDD)/Flash memory units. Among other things, the SSD memory disk units and/or HDD/Flash memory units adjust a synchronization of a data signal transmitted/received between the host and a memory disk during data communications between the host and the memory disk through a PCI-Express interface and simultaneously support a high-speed data processing speed for the memory disk, thereby supporting the performance of the memory to enable high-speed processing in an existing interface environment at the maximum.

Provided is a RAID controlled storage device of a PCI-Express (PCI-e) type, which provides data storage/reading services through a PCI-Express interface. The RAID controller typically includes a disk mount coupled to a set of PCI-Express SSD memory disk units, the set of PCI-Express SSD memory disk units comprising a set of volatile semiconductor memories; a disk monitoring unit coupled to the disk mount for monitoring the set of PCI-Express memory disk units; a disk plug and play controller coupled to the disk monitoring unit and the disk mount for controlling the disk mount; a high speed host interface coupled to the disk monitoring unit and the disk mount for providing high-speed host interface capabilities; a disk controller coupled to the high speed host interface and the disk monitoring unit; and a host interface coupled to the disk controller.

The storage device of a PCI-Express (PCI-e) type supports a low-speed data processing speed for a host by adjusting synchronization of a data signal transmitted/received between the host and a memory disk during data communications between the host and the memory disk through a PCI-Express interface, and simultaneously supports a high-speed data processing speed for the memory disk, thereby supporting the performance of the memory to enable high-speed data processing in an existing interface environment at the maximum. It is understood in advance that although PCI-Express technology will be utilized in a typical embodiment, other alternatives are possible. For example, the present invention could utilize SAS/SATA technology in which a SAS/SATA type storage device is provided that utilizes a SAS/SATA interface.

Referring now to FIG. 1, a diagram schematically illustrating a configuration of a PCI-Express type, RAID controlled storage device (e.g., for providing storage for a PCI-Express (PCI-e) type is shown. As depicted, FIG. 1 shows a RAID controlled PCI-Express type storage device according to an embodiment of the invention which includes a memory disk unit 100 comprising: a plurality of memory disks having a plurality of volatile semiconductor memories (also referred to herein as high speed semiconductor storage device (SSD) memory disk units 100); a RAID controller 800 coupled to SSD memory disk units 100; an interface unit 200 (e.g., PCI-Express host) which interfaces between the memory disk unit and a host; a controller unit 300; an auxiliary power source unit 400 that is charged to maintain a predetermined power using the power transferred from the host through the PCI-Express host interface unit; a power source control unit 500 that supplies the power transferred from the host through the PCI-Express host interface unit to the controller unit, the memory disk unit, the backup storage unit, and the backup control unit which, when the power transferred from the host through the PCI-Express host interface unit is blocked or an error occurs in the power transferred from the host, receives power from the auxiliary power source unit and supplies the power to the memory disk unit through the controller unit; a backup storage unit 600 that stores data of the memory disk unit; and a backup control unit 700 that backs up data stored in the memory disk unit in the backup storage unit, according to an instruction from the host or when an error occurs in the power transmitted from the host.

The memory disk unit 100 includes a plurality of memory disks provided with a plurality of volatile semiconductor memories for high-speed data input/output (for example, DDR, DDR2, DDR3, SDRAM, and the like), and inputs and outputs data according to the control of the controller 300. The memory disk unit 100 may have a configuration in which the memory disks are arrayed in parallel.

The PCI-Express host interface unit 200 interfaces between a host and the memory disk unit 100. The host may be a computer system or the like, which is provided with a PCI-Express interface and a power source supply device.

The controller unit 300 adjusts synchronization of data signals transmitted/received between the PCI-Express host interface unit 200 and the memory disk unit 100 to control a data transmission/reception speed between the PCI-Express host interface unit 200 and the memory disk unit 100.

Figure 2:
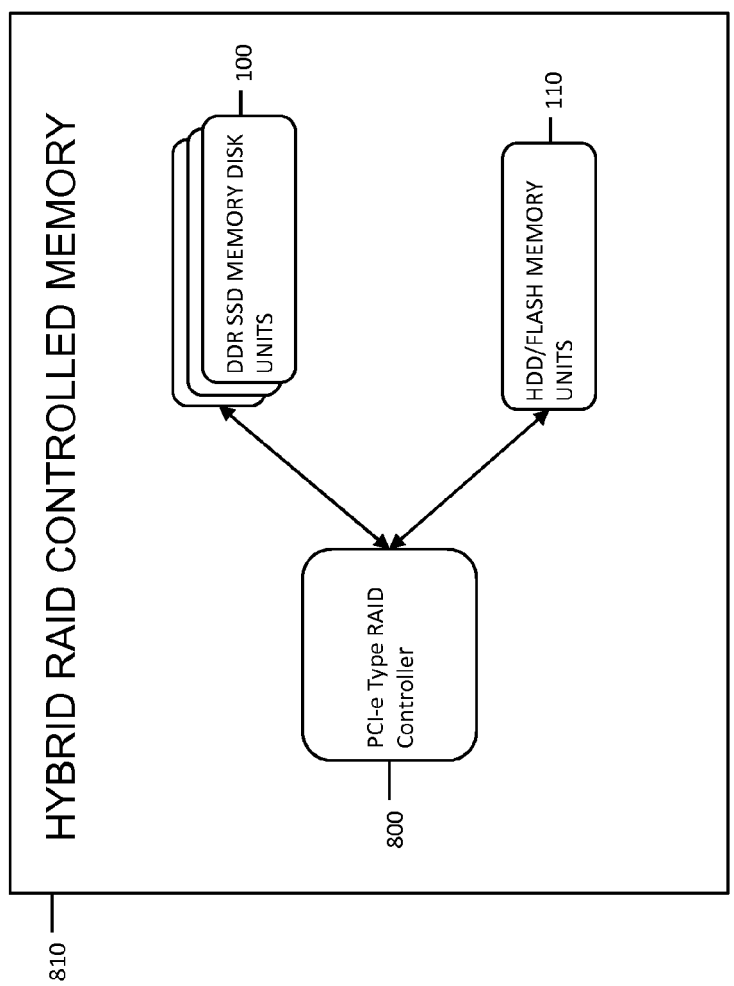
FIG. 2 is a more specific diagram of a hybrid RAID controller coupled to a set of SSD memory disk units and HDD/flash memory units.

Referring now to FIG. 2, a more detailed diagram of a RAID controlled SSD 810 is shown. As depicted, a PCI-e type RAID controller 800 can be directly coupled to any quantity of SSD memory disk units 100. Among other things, this allows for optimum control of SSD memory disk units 100. Among other things, the use of a RAID controller 800:

1. Supports the current backup/restore operations.
2. Provides additional and improved backup function by performing the following:
   a) The internal backup controller determines the backup (user's request order or the status monitor detects power supply problems);
   b) The Internal backup controller requests a data backup to SSD memory disk units;
   c) The internal backup controller requests internal backup device to backup data immediately;
   d) Monitors the status of the backup for the SSD memory disk units and internal backup controller; and
   e) Reports the internal backup controller's status and end-op.
3. Provides additional and improved restore function by performing the following:
   a) The internal backup controller determines the restore (user's request order or the status monitor detects power supply problems);
   b) The internal backup controller requests a data restore to the SSD memory disk units;
   c) The internal backup controller requests internal backup device to restore data immediately;
   d) Monitors the status of the restore for the SSD memory disk units and internal backup controller; and
   e) Reports the internal backup controller status and end-op.

Figure 3:
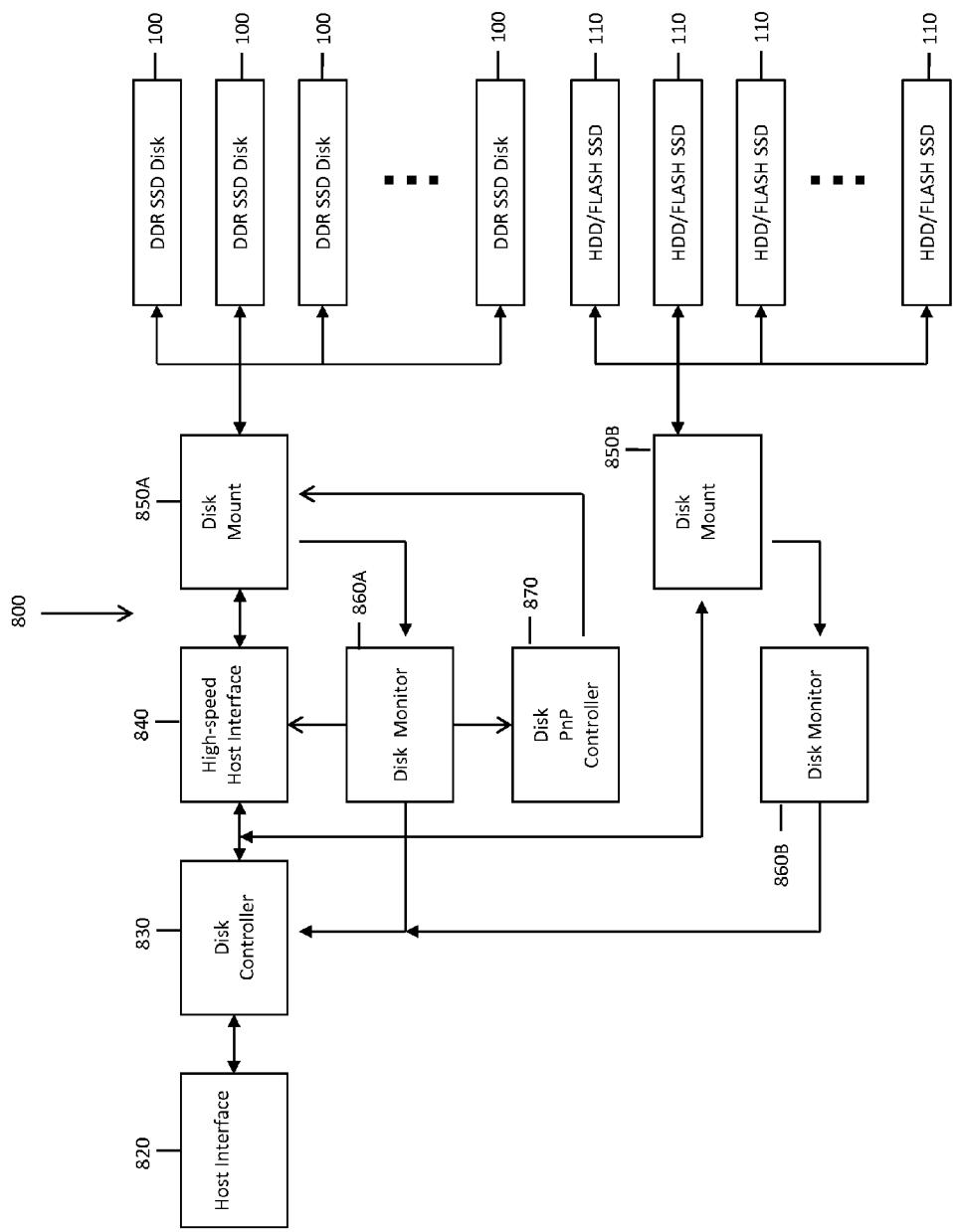
FIG. 3 is a diagram of the hybrid RAID controller of FIGS. 1 and 2.

Referring now to FIG. 3, a diagram of the hybrid RAID controller 800 of FIGS. 1 and 2 as coupled to a set (at least one) of SSD memory disk units 100 and a set of HDD/flash memory units is shown in greater detail (collectively shown as unit 810 in FIG. 1). As depicted, hybrid RAID controller generally 800 comprises: a host interface 820; a disk controller 830 coupled to host interface 820; and a high-speed host interface 840. Also coupled to disk controller 830 is a first disk monitoring unit 860A, which is coupled to the first disk mount 850A. In general, SSD memory disk units 100 are mounted on first disk mount 850A and are detected by first disk monitoring unit 860A. Still yet, shown coupled to disk controller 830 is a second disk monitoring unit 860B, which is coupled to a second disk mount 850B. In general, HDD/Flash memory units 110 are mounted on second disk mount 850B and are detected by second disk monitoring unit 860B. Disk plug and play (PnP controller 870) controls the functions and/or detection functions related to first disk mount 850A and second disk mount 850B. In general, hybrid RAID controller 800 controls the operation of SSD memory disk units 100 and HDD/Flash memory units 110. This includes the detection of SSD memory disk units 100 and HDD/Flash memory units 110, the storage and retrieval of data therefrom, etc.

Figure 4:
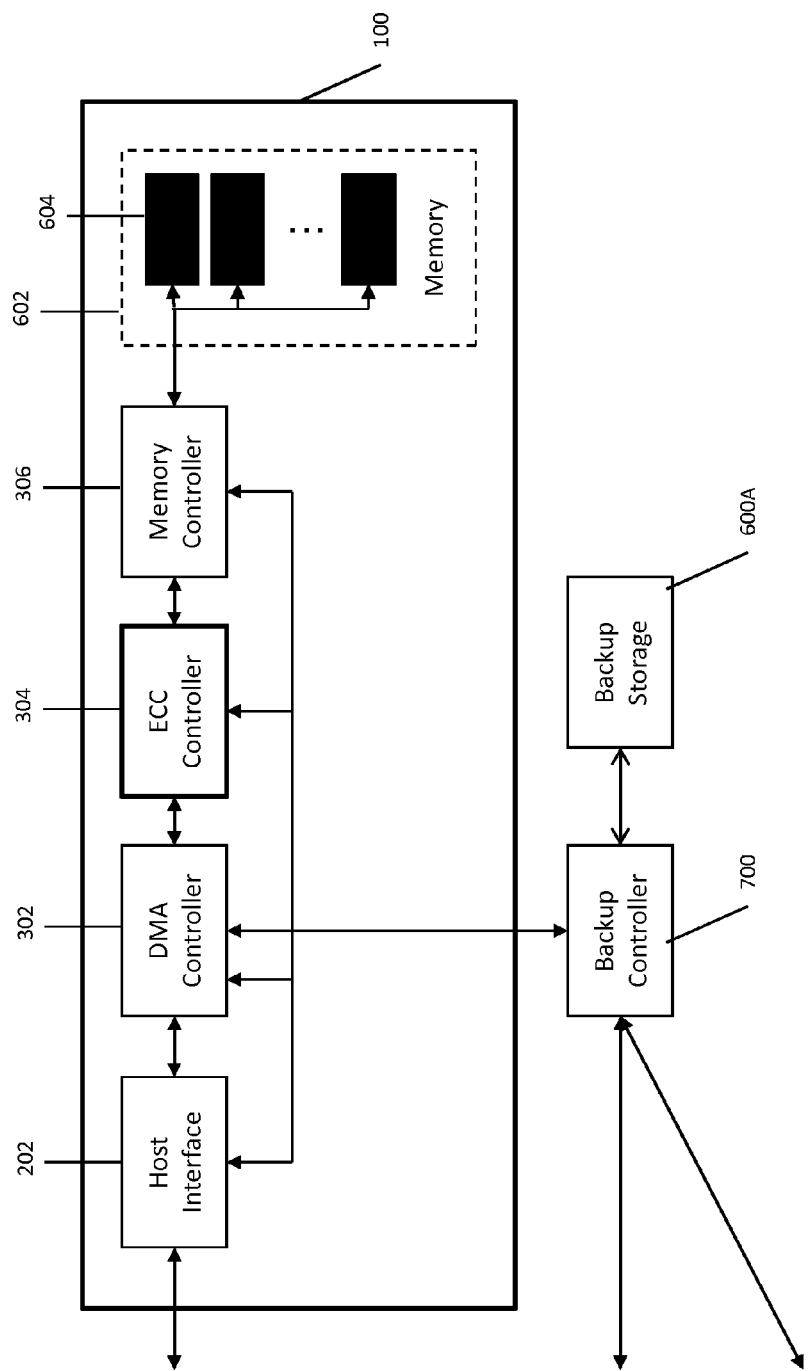
FIG. 4 is a diagram schematically illustrating a configuration of the high speed SSD of FIG. 1.

Referring now to FIG. 4, a diagram schematically illustrating a configuration of the high speed SSD 100 is shown. As depicted, SSD/memory disk unit 100 comprises: a host interface 202 (e.g., PCI-Express host) (which can be interface 200 of FIG. 1, or a separate interface as shown); a DMA controller 302 interfacing with a backup control module 700; an ECC controller 304; and a memory controller 306 for controlling one or more blocks 604 of memory 602 that are used as high speed storage.

Figure 5:
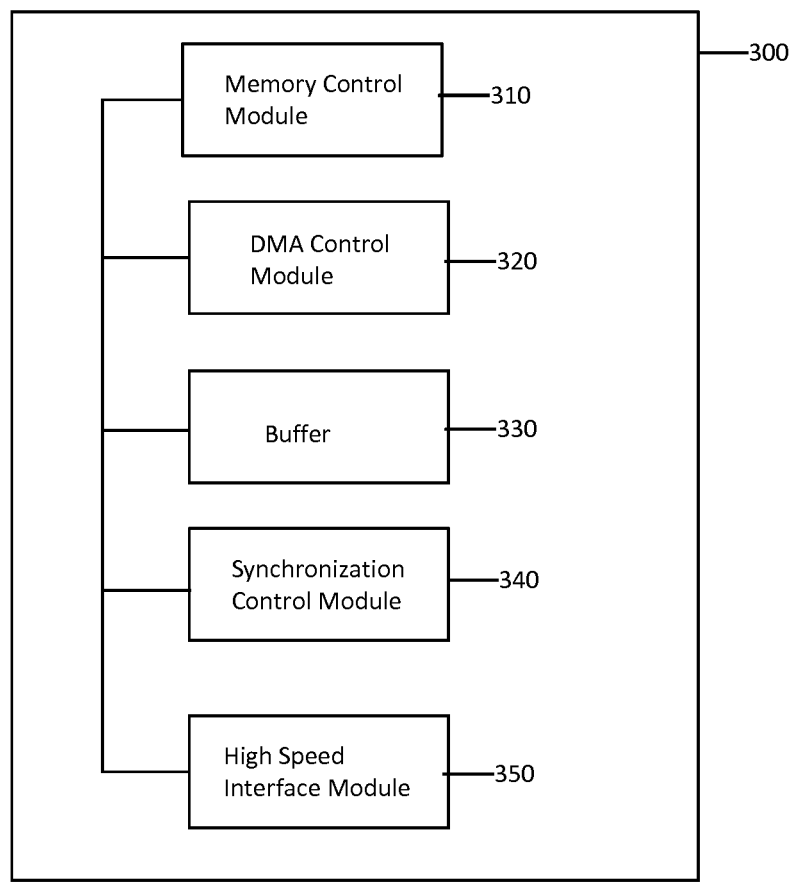
FIG. 5 is a diagram schematically illustrating a configuration of a controller unit in FIG. 1.

FIG. 5 is a diagram schematically illustrating a configuration of the controller unit provided in the PCI-Express type storage device according to the embodiment. Referring to FIG. 5, the controller unit 300 according to the embodiment includes: a memory control module 310 which controls data input/output of the memory disk unit 100; a DMA (Direct Memory Access) control module 320 which controls the memory control module 310 to store the data in the memory disk unit 100, or reads data from the memory disk unit 100 to provide the data to the host, according to an instruction from the host received through the PCI-Express host interface unit 200; a buffer 330 which buffers data according to the control of the DMA control module 320; a synchronization control module 340 which, when receiving a data signal corresponding to the data read from the memory disk unit 100 by the control of the DMA control module 320 through the DMA control module 320 and the memory control module 310, adjusts synchronization of a data signal so as to have a communication speed corresponding to a PCI-Express communications protocol to transmit the synchronized data signal to the PCI-Express host interface unit 200, and when receiving a data signal from the host through the PCI-Express host interface unit 200, adjusts synchronization of the data signal so as to have a transmission speed corresponding to a communications protocol (for example, PCI, PCI-x, or PCI-e, and the like) used by the memory disk unit 100 to transmit the synchronized data signal to the memory disk unit 100 through the DMA control module 320 and the memory control module 310; and a high-speed interface module 350 which processes the data transmitted/received between the synchronization control module 340 and the DMA control module 320 at high speed. Here, the high-speed interface module 350 includes a buffer having a double buffer structure and a buffer having a circular queue structure and processes the data transmitted/received between the synchronization control module 340 and the DMA control module 320 without loss at high speed by buffering the data transmitted/received between the synchronization control module 340 and the DMA control module 320 using the buffers and adjusting data clocks.

The auxiliary power source unit 400 may be configured as a rechargeable battery or the like, so that it is normally charged to maintain a predetermined power using power transferred from the host through the PCI-Express host interface unit 200 and supplies the charged power to the power source control unit 500 according to the control of the power source control unit 500.

The power source control unit 500 supplies the power transferred from the host through the PCI-Express host interface unit 200 to the controller unit 300, the memory disk unit 100, the backup storage unit 600, and the backup control unit 700.

In addition, when an error occurs in a power source of the host because the power transmitted from the host through the PCI-Express host interface unit 200 is blocked, or the power transmitted from the host deviates from a threshold value, the power source control unit 500 receives power from the auxiliary power source unit 400 and supplies the power to the memory disk unit 100 through the controller unit 300.

The backup storage unit 600 is configured as a low-speed non-volatile storage device such as a hard disk and stores data of the memory disk unit 100.

The backup control unit 700 backs up data stored in the memory disk unit 100 in the backup storage unit 600 by controlling the data input/output of the backup storage unit 600 and backs up the data stored in the memory disk unit 100 in the backup storage unit 600 according to an instruction from the host, or when an error occurs in the power source of the host due to a deviation of the power transmitted from the host deviates from the threshold value.

While the exemplary embodiments have been shown and described, it will be understood by those skilled in the art that various changes in form and details may be made thereto without departing from the spirit and scope of this disclosure as defined by the appended claims. In addition, many modifications can be made to adapt a particular situation or material to the teachings of this disclosure without departing from the essential scope thereof. Therefore, it is intended that this disclosure not be limited to the particular exemplary embodiments disclosed as the best mode contemplated for carrying out this disclosure, but that this disclosure will include all embodiments falling within the scope of the appended claims.

The RAID controlled storage device of a PCI-Express (PCI-e) type supports a low-speed data processing speed for a host by adjusting synchronization of a data signal transmitted/received between the host and a memory disk during data communications between the host and the memory disk through a PCI-Express interface and simultaneously supports a high-speed data processing speed for the memory disk, thereby supporting the performance of the memory to enable high-speed data processing in an existing interface environment at the maximum.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A hybrid RAID controller, comprising:
   a first disk mount coupled to a set of SSD memory disk units, the set of SSD memory disk units comprising a set of volatile semiconductor memories;
   a first disk monitoring unit coupled to the first disk mount for monitoring the set of SSD memory disk units;
   a disk plug and play controller coupled to the first disk monitoring unit and the first disk mount for controlling the disk mount;
   a high speed host interface coupled to the first disk monitoring unit and the first disk mount for providing high-speed host interface capabilities;
   a second disk mount coupled to a set of HDD/Flash memory units;
   a second disk monitoring unit coupled to the second disk mount for monitoring the set of HDD/Flash memory units;
   a controller unit coupled to the hybrid RAID controller;
   a backup storage unit coupled to the controller unit which stores data of the set of SSD memory disk units; and
   a backup control unit coupled to the controller unit which backs up data stored in the set of SSD memory disk units in the backup storage unit according to an instruction from the host, or when an error occurs in the power transmitted from the host.

2. The hybrid RAID controller of claim 1, further comprising a disk controller coupled to the high speed host interface, the first disk monitoring unit and the second disk monitoring unit.

3. The hybrid RAID controller of claim 2, further comprising a host interface coupled to the disk controller.

4. The hybrid RAID controller of claim 1, wherein the controller unit comprises:
   a memory control module for controlling data input/output of the set of SSD memory disk units;
   a DMA control module which controls the memory control module to store data in the set of SSD memory disk units or reads data from the set of SSD memory disk units to provide the data to the host, according to an instruction from the host received through the host interface unit;
   a buffer which buffers data according to control of the DMA control module;
   a synchronization control module which, when receiving a data signal corresponding to the data read from the set of SSD memory disk units by the control of the DMA control module through the DMA control module and the memory control module, adjusts synchronization of a data signal so as to have a communication speed corresponding to a PCI-Express communications protocol to transmit the synchronized data signal to the PCI-Express host interface unit and, when receiving a data signal from the host through the PCI-Express host interface unit, adjusts synchronization of the data signal so as to have a transmission speed corresponding to a communications protocol used by the set of SSD memory disk units to
   transmit the synchronized data signal to the set of SSD memory disk units through the DMA control module and the memory control module; and
   a high-speed interface module which processes the data transmitted/received between the synchronization control module and the DMA control module at high speed, includes a buffer having a double buffer structure and a buffer having a circular queue structure, and processes the data transmitted/received between the synchronization control module and the DMA control without loss of high speed by buffering the data transmitted/received between the synchronization control module and the DMA control module using the buffers and adjusting data clocks.

5. The hybrid RAID controller of claim 1, further comprising:
   an auxiliary power source unit coupled to the backup control unit which is charged to maintain a predetermined power using the power transferred from the host through the host interface unit; and
   a power source control unit coupled to the auxiliary power source unit which supplies the power transferred from the host through the host interface unit to the controller unit, the set of SSD memory disk units, the backup storage unit, and the backup control unit, and when the power transferred from the host through the host interface unit is blocked, or an error occurs in the power transferred from the host, receives power from the auxiliary power source unit and supplies the power to the memory disk units through the controller unit.

6. The hybrid RAID controller of claim 1, the host interface unit being a PCIExpress host interface unit.

7. The hybrid RAID controller of claim 1, each of the set of SSD memory disk units comprising:
   a host interface unit;
   a DMA controller coupled to the host interface unit;

an ECC controller coupled to the DMA controller;
a memory controller coupled to the ECC controller; and
a memory array coupled to the memory controller, the memory array comprising at least one memory block.

8. The hybrid RAID controller of claim 1, the set of SSD memory disk units providing storage for an attached computer device.

9. A hybrid RAID controller, comprising:
a first disk mount coupled to a set of PCI-Express SSD memory disk units, the set of PCI-Express SSD memory disk units comprising a set of volatile semiconductor memories;
a first disk monitoring unit coupled to the first disk mount for monitoring the set of PCI-Express memory disk units;
a disk plug and play controller coupled to the first disk monitoring unit and the disk mount for controlling the first disk mount;
a high speed host interface coupled to the first disk monitoring unit and the first disk mount for providing high-speed host interface capabilities;
a second disk mount coupled to a set of HDD/Flash memory units;
a second disk monitoring unit coupled to the second disk mount for monitoring the set of HDD/Flash memory units;
a disk controller coupled to the high speed host interface, the first disk monitoring unit and the second disk monitoring unit;
a host interface coupled to the disk controller;
a controller unit coupled to the Hybrid RAID controller;
a backup storage unit coupled to the controller unit which stores data of the set of PCI-Express memory disk units; and
a backup control unit coupled to the controller unit which backs up data stored in the set of PCI-Express memory disk units in the backup storage unit, according to an instruction from the host or when an error occurs in the power transmitted from the host.

10. The hybrid RAID controller of claim 9, wherein the controller unit comprises:
a memory control module for controlling data input/output of the set of PCI-Express memory disk units;
a DMA control module which controls the memory control module to store data in the set of PCI-Express memory disk units or reads data from the set of PCI-Express memory disk units to provide the data to the host, according to an instruction from the host received through the host interface unit;
a buffer which buffers data according to control of the DMA control module;
a synchronization control module which, when receiving a data signal corresponding to the data read from the set of PCI-Express memory disk units by the control of the DMA control module through the DMA control module and the memory control module, adjusts synchronization of a data signal so as to have a communication speed corresponding to a PCI-Express communications protocol to transmit the synchronized data signal to the PCI-Express host interface unit, and, when receiving a data signal from the host through the PCI-Express host interface unit, adjusts synchronization of the data signal so as to have a transmission speed corresponding to a communications protocol used by the set of PCI-Express memory disk units to transmit the synchronized data signal to the set of PCI-Express memory disk units through the DMA control module and the memory control module; and
a high-speed interface module which processes the data transmitted/received between the synchronization control module and the DMA control module at high speed, includes a buffer having a double buffer structure and a buffer having a circular queue structure, and processes the data transmitted/received between the synchronization control module and the DMA control without loss of high speed by buffering the data transmitted/received between the synchronization control module and the DMA control module using the buffers and adjusting data clocks.

11. The hybrid RAID controller of claim 9, further comprising:
an auxiliary power source unit coupled to the backup control unit which is charged to maintain a predetermined power using the power transferred from the host through the host interface unit; and
a power source control unit coupled to the auxiliary power source unit which supplies the power transferred from the host through the host interface unit to the controller unit, the set of PCI-Express memory disk units, the backup storage unit, and the backup control unit, and when the power transferred from the host through the host interface unit is blocked or an error occurs in the power transferred from the host, receives power from the auxiliary power source unit and supplies the power to the memory disk units through the controller unit.

12. The hybrid RAID controller of claim 9, each of the set of PCI-Express memory disk units comprising:
a host interface unit;
a DMA controller coupled to the host interface unit;
an FCC controller coupled to the DMA controller;
a memory controller coupled to the ECC controller; and
a memory array coupled to the memory controller, the memory array comprising at least one memory block.

13. The hybrid RAID controller of claim 9, the set of PCI-Express memory disk units providing storage for an attached computer device.

14. A method for providing a hybrid RAID controller, comprising:
providing a first disk mount coupled to a set of SSD memory disk units, the set of SSD memory disk units comprising a set of volatile semiconductor memories;
providing a first disk monitoring unit coupled to the first disk mount for monitoring the set of SSD memory disk units;
providing a disk plug, and play controller coupled to the first disk monitoring unit and the first disk mount for controlling the disk mount;
providing a high speed host interface coupled to the disk monitoring unit and the disk mount for providing high-speed host interface capabilities;
providing a second disk mount coupled to a set of HDD/Flash memory units;
providing a second disk monitoring unit coupled to the second disk mount for monitoring the set of HDD/Flash memory units;
providing a controller unit coupled to the hybrid RAID controller;
providing a backup storage unit coupled to the controller unit which stores data of the set of SSD memory disk units; and
providing a backup control unit coupled to the controller unit which backs up data stored in the set of SSD memory disk units in the backup storage unit according to an instruction from the host, or when an error occurs in the power transmitted from the host.

15. The method of claim 14, further comprising providing a disk controller coupled to the high speed host interface, the first disk monitoring unit, and the second disk monitoring unit.

16. The method of claim 15, further comprising providing a host interface coupled to the disk controller.

17. The method of claim 14, wherein the controller unit comprises:
- a memory control module for controlling data input/output of the set of SSD memory disk units;
- a DMA control module which controls the memory control module to store data in the set of SSD memory disk units or reads data from the set of SSD memory disk units to provide the data to the host, according to an instruction from the host received through the host interface unit;
- a buffer which buffers data according to control of the DMA control module;
- a synchronization control module which, when receiving a data signal corresponding to the data read from the set of SSD memory disk units by the control of the DMA control module through the DMA control module and the memory control module, adjusts synchronization of a data signal so as to have a communication speed corresponding to a PCI-Express communications protocol to transmit the synchronized data signal to the PCI-Express host interface unit and, when receiving a data signal from the host through the PCI-Express host interface unit, adjusts synchronization of the data signal so as to have a transmission speed corresponding to a communications protocol used by the set of SSD memory disk units to transmit the synchronized data signal to the set of SSD memory disk units through the DMA control module and the memory control module; and
- a high-speed interface module which processes the data transmitted/received between the synchronization control module and the DMA control module at high speed, and includes a buffer having a double buffer structure and a buffer having a circular queue structure, and processes the data transmitted/received between the synchronization control module and the DMA control without loss of high speed by buffering the data transmitted/received between the synchronization control module and the DMA control module using the buffers and adjusting data clocks.

* * * * *